US011556324B2

(12) United States Patent
Nakazawa

(10) Patent No.: US 11,556,324 B2
(45) Date of Patent: Jan. 17, 2023

(54) MANAGEMENT APPARATUS AND MANAGEMENT METHOD

(71) Applicant: CANON KABUSHIKI KAISHA, Tokyo (JP)

(72) Inventor: Toshiyuki Nakazawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 11 days.

(21) Appl. No.: 16/176,445

(22) Filed: Oct. 31, 2018

(65) Prior Publication Data

US 2019/0146769 A1 May 16, 2019

(30) Foreign Application Priority Data

Nov. 10, 2017 (JP) ............................ JP2017-216978
Jun. 13, 2018 (JP) ............................ JP2018-112449

(51) Int. Cl.

*G06F 8/61* (2018.01)
*H04L 41/00* (2022.01)
*G06F 9/445* (2018.01)

(52) U.S. Cl.

CPC ................ *G06F 8/61* (2013.01); *H04L 41/20* (2013.01); *G06F 9/445* (2013.01)

(58) Field of Classification Search

CPC ............. G06F 8/61; G06F 9/445; H04L 41/20
USPC .......................................................... 717/178
See application file for complete search history.

(56) References Cited

U.S. PATENT DOCUMENTS 7,836,337 B1 * 11/2010 Wu ..................... G06F 11/1469 714/15
10,257,250 B2 * 4/2019 Nakazawa .............. H04L 41/20
10,503,904 B1 * 12/2019 Singh .................... G06F 21/566
2005/0204353 A1 * 9/2005 Ji ........................ G06F 11/1433 717/168
2010/0037216 A1 * 2/2010 Carcerano ................. G06F 8/65 717/173
2010/0257224 A1 * 10/2010 Tobita ....................... G06F 8/61 709/202
2012/0059916 A1 * 3/2012 Ohashi ...................... G06F 8/61 709/222
2012/0209974 A1 * 8/2012 Igarashi ................ H04L 41/022 709/223
2013/0212278 A1 * 8/2013 Marshall ................ H04L 47/70 709/226

(Continued)

FOREIGN PATENT DOCUMENTS

JP 2014-32597 A 2/2014

*Primary Examiner* — Lewis A Bullock, Jr.
*Assistant Examiner* — Theodore E Hebert
(74) *Attorney, Agent, or Firm* — Canon U.S.A., Inc. IP Division

(57) ABSTRACT

A manager creates agent information and provides a download page for an installer. In a case where the downloaded installer is activated in a host computer, agent installation processing is executed according to input work for setting information for connection with the manager by a user. Further, in a case where creation of the agent in its own apparatus is instructed, the manager creates, in the apparatus in which the manager operates, an agent in which the setting information for connection with the manager has been set, without the input work by the user that is necessary for the above-described installation processing using the installer.

10 Claims, 12 Drawing Sheets

(56) References Cited

U.S. PATENT DOCUMENTS

2014/0040425 A1* 2/2014 Nakazawa .............. H04L 41/20
709/217
2014/0111824 A1* 4/2014 Onishi .................. G06F 3/1204
358/1.13
2016/0366233 A1* 12/2016 Le ............................ G06F 8/65
2017/0323087 A1* 11/2017 Kline ...................... G06F 21/44
2019/0146769 A1* 5/2019 Nakazawa .............. H04L 43/12
717/178

* cited by examiner

300
LIST OF AGENTS
+ NEW CREATION
301
DOWNLOAD OF INSTALLER
303
302
ID
NAME
IP ADDRESS
STATE
d2586ff5-8854-4394
HQ
localhost
VALID
a8281e2c-3421-4b7a
OSAKA OFFICE
INVALID
d22d1587-98fd-4b35
NY OFFICE
192.168.46.17
VALID

Figures 4A, 4B:
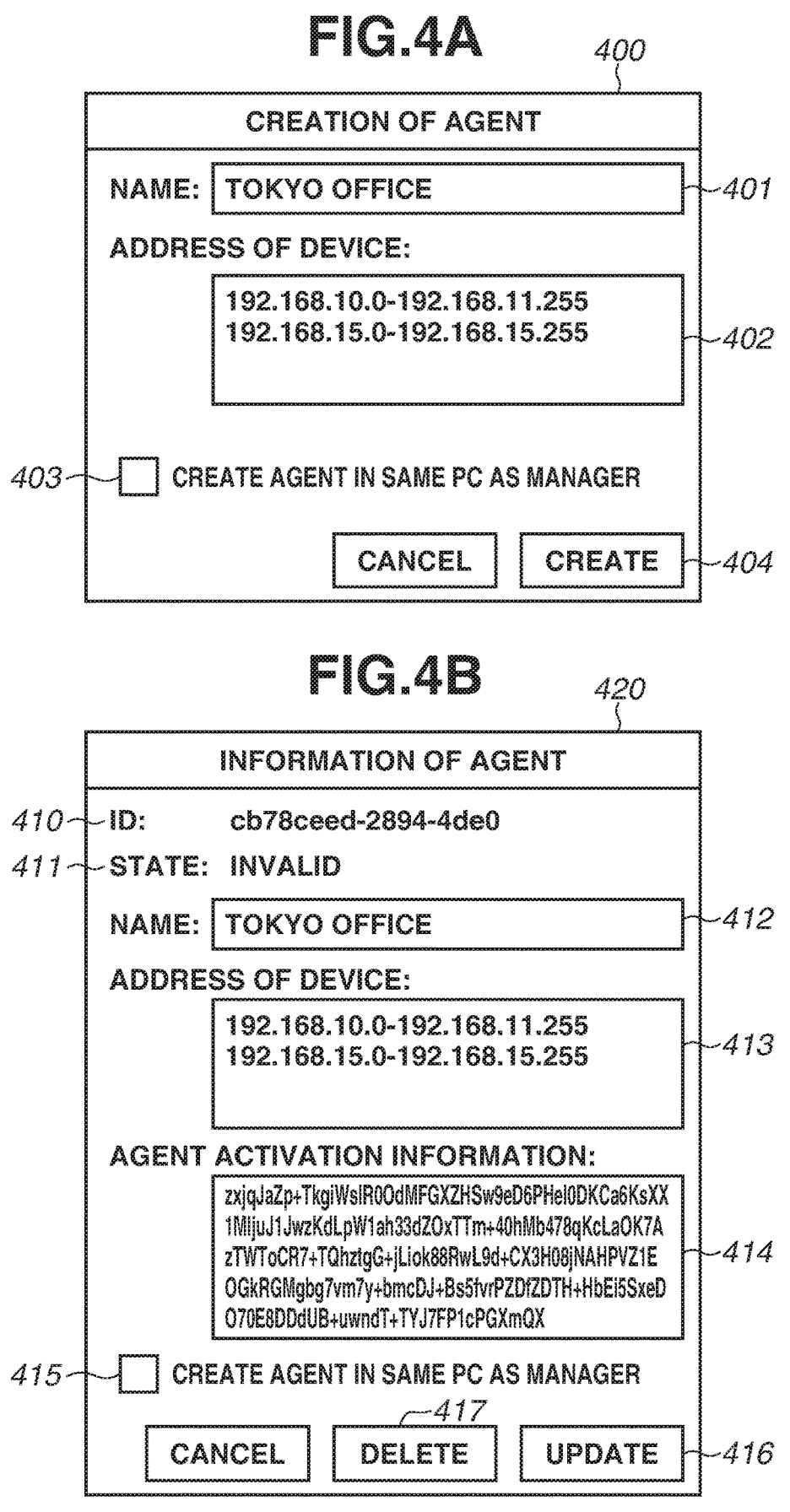

CREATION OF AGENT

NAME: TOKYO OFFICE 401

ADDRESS OF DEVICE:

192.168.10.0-192.168.11.255
192.168.15.0-192.168.15.255 402

403 CREATE AGENT IN SAME PC AS MANAGER

CANCEL CREATE 404

INFORMATION OF AGENT

410 ID: cb78ceed-2894-4de0

411 STATE: INVALID

NAME: TOKYO OFFICE 412

ADDRESS OF DEVICE:

192.168.10.0-192.168.11.255
192.168.15.0-192.168.15.255 413

AGENT ACTIVATION INFORMATION:

zxjqJaZp+TkgiWslR0OdMFGXZHSw9eD6PHel0DKCa6KsXX
1MljuJ1JwzKdLpW1ah33dZOxTTm+40hMb478qKcLaOK7A
zTWToCR7+TQhztgG+jLiok88RwL9d+CX3H08jNAHPVZ1E
OGkRGMgbg7vm7y+bmcDJ+Bs5fvrPZDfZDTH+HbEi5SxeD
O70E8DDdUB+uwndT+TYJ7FP1cPGXmQX 414

415 CREATE AGENT IN SAME PC AS MANAGER

417

CANCEL DELETE UPDATE 416

Figure 5:
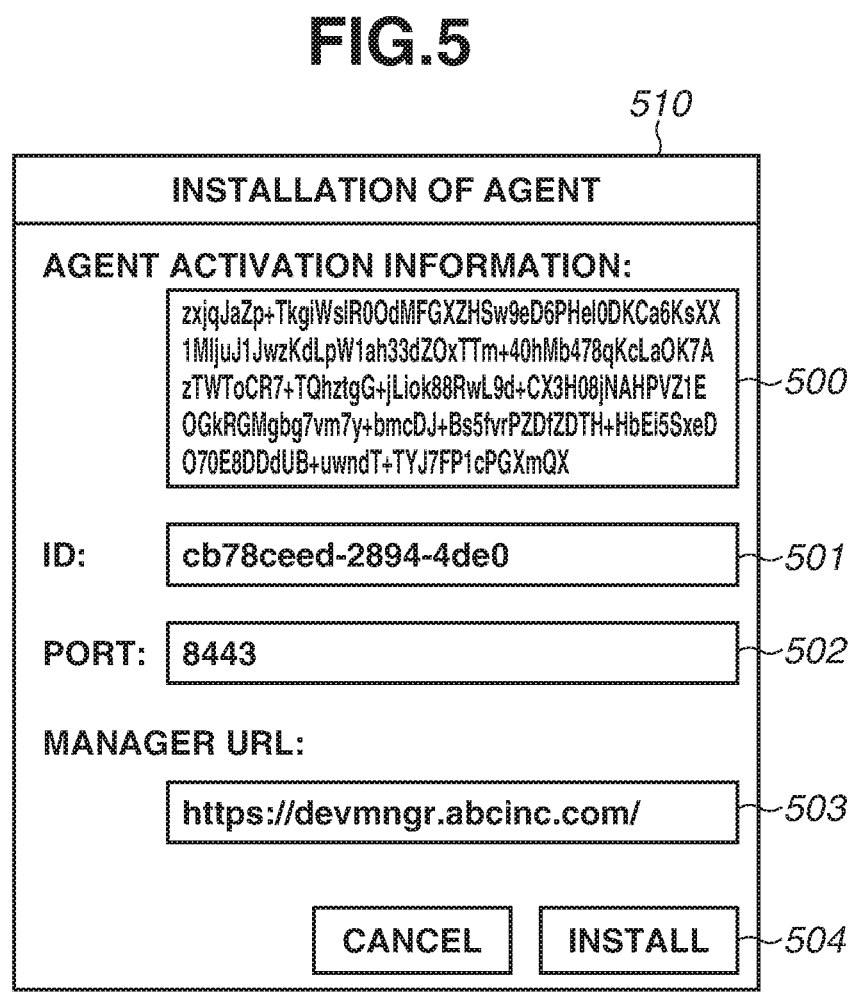

INSTALLATION OF AGENT

AGENT ACTIVATION INFORMATION:

zxjqJaZp+TkgiWslR0OdMFGXZHSw9eD6PHel0DKCa6KsXX
1MljuJ1JwzKdLpW1ah33dZOxTTm+40hMb478qKcLaOK7A
zTWToCR7+TQhztgG+jLiok88RwL9d+CX3H08jNAHPVZ1E
OGkRGMgbg7vm7y+bmcDJ+Bs5fvrPZDfZDTH+HbEi5SxeD
O70E8DDdUB+uwndT+TYJ7FP1cPGXmQX

500

ID: cb78ceed-2894-4de0

501

PORT: 8443

502

MANAGER URL:

https://devmngr.abcinc.com/

503

CANCEL INSTALL

504

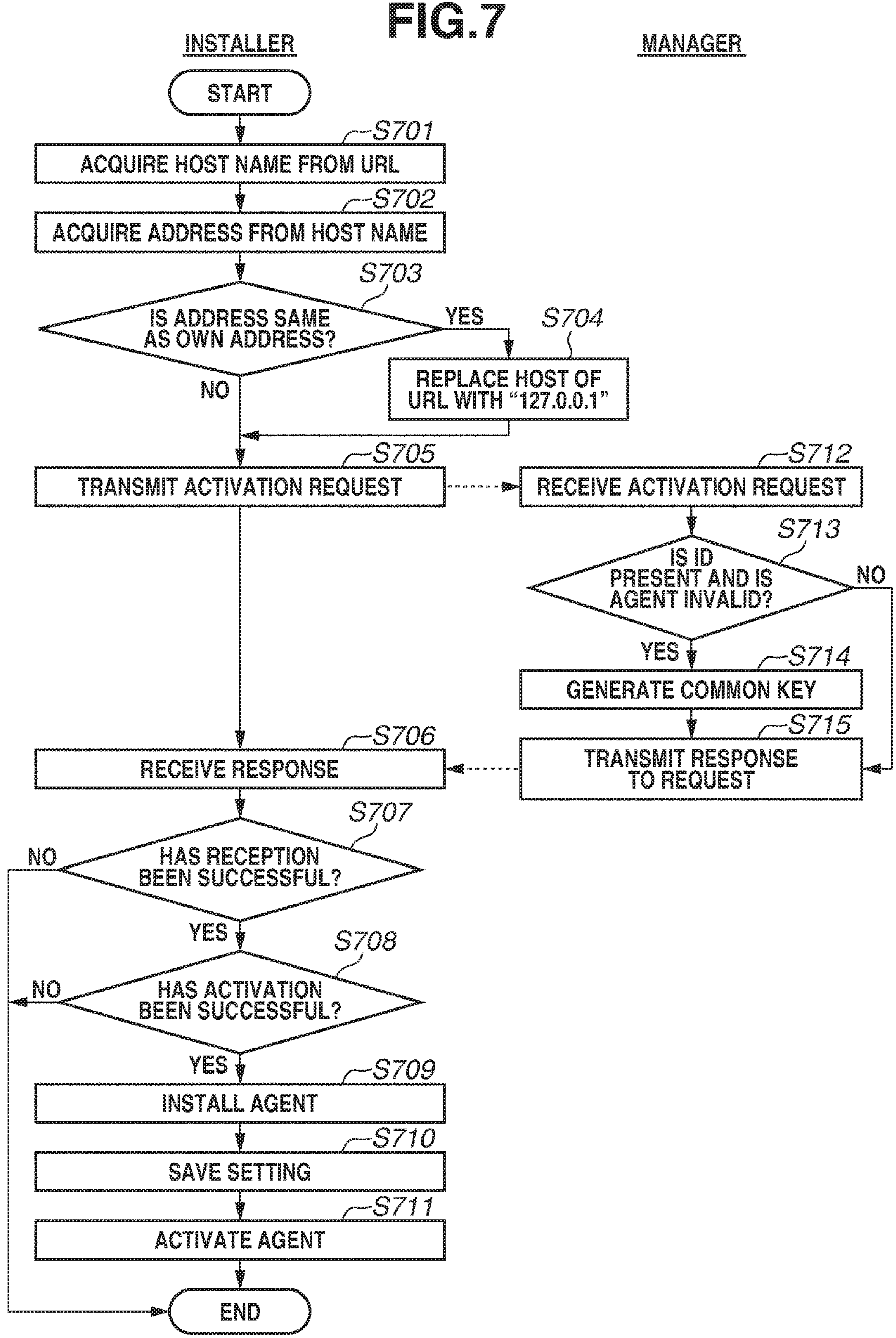
FIG.7
INSTALLER
MANAGER
START
S701
ACQUIRE HOST NAME FROM URL
S702
ACQUIRE ADDRESS FROM HOST NAME
S703
IS ADDRESS SAME AS OWN ADDRESS?
YES
NO
S704
REPLACE HOST OF URL WITH "127.0.0.1"
S705
TRANSMIT ACTIVATION REQUEST
S712
RECEIVE ACTIVATION REQUEST
S713
IS ID PRESENT AND IS AGENT INVALID?
NO
YES
S714
GENERATE COMMON KEY
S715
TRANSMIT RESPONSE TO REQUEST
S706
RECEIVE RESPONSE
S707
HAS RECEPTION BEEN SUCCESSFUL?
NO
YES
S708
HAS ACTIVATION BEEN SUCCESSFUL?
NO
YES
S709
INSTALL AGENT
S710
SAVE SETTING
S711
ACTIVATE AGENT
END

MANAGEMENT APPARATUS AND MANAGEMENT METHOD

BACKGROUND

Field of the Disclosure

The present disclosure relates to a technology to manage a device through an agent.

Description of the Related Art

Japanese Patent Application Laid-Open No. 2014-32597 discusses a method of installing an agent (also referred to as client) in an existing manager/agent system (also referred to as server/client system). In the method discussed in Japanese Patent Application Laid-Open No. 2014-32597, when the manager generates an agent installer, information for activating the agent on the manager through communication with the manager at the time of installation is included in the installer to facilitate installation of the agent.

In a small-scale customer environment, a monitoring server serving as the manager often manages a network device without using the agent.

In the above-described conventional example, however, if it is assumed that the agent is installed in the host computer same as the host computer on which the manager operates, it is necessary for a user to create and acquire the agent installer and to perform installation work of the agent with use of the acquired installer. This is extremely complicated.

SUMMARY

According to an aspect of the present invention, a management apparatus that manages one or a plurality of devices in cooperation with an agent monitoring the one or the plurality of devices, includes a memory storing instructions, and at least one processor executing the instructions causing the management apparatus to create agent information of a first agent, corresponding to device information to be monitored by the first agent, provide an installer download function to install, in an information processing apparatus, an agent program that causes the information processing apparatus to operate as the first agent, wherein, in a case where the installer downloaded according to the provided function is executed in the information processing apparatus, first installation processing for installing the agent program in the information processing apparatus is executed according to an input for setting information for connection with the management apparatus, receive an instruction to create a second agent in the management apparatus, and execute, in a case where the instruction to create the second agent in the management apparatus is received, agent creation processing for creating within the management apparatus the second agent in which the setting information for connection with the management apparatus has been set, without the input performed in the first installation processing.

Further features of the present invention will become apparent from the following description of exemplary embodiments with reference to the attached drawings.

BRIEF DESCRIPTION OF THE DRAWINGS

FIGS. 4A and 4B are diagrams respectively illustrating an agent creation screen and an agent information screen of an active agent.

FIG. 5 is a diagram illustrating an installation screen.

FIG. 7 is a flowchart illustrating activation of the agent and installation processing.

DESCRIPTION OF THE EMBODIMENTS

Exemplary embodiments of the present invention are described below with reference to drawings.

Figure 1A:
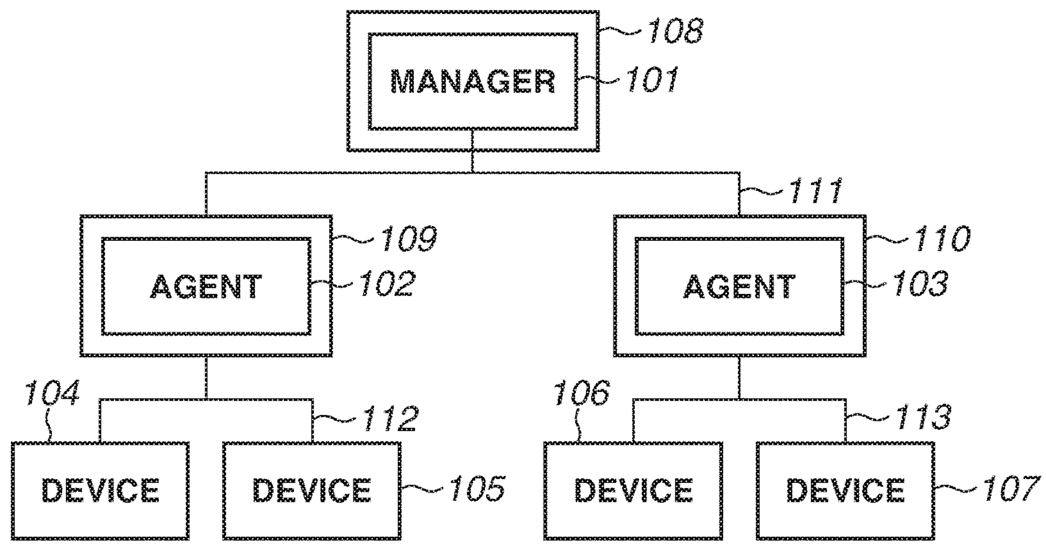
FIGS. 1A to 1C are configuration diagrams each illustrating a network device management system according to a first exemplary embodiment.

FIG. 1A is a diagram illustrating an example of an entire configuration of a network device management system according to a first exemplary embodiment of the present invention.

The network device management system includes one manager 101 and a plurality of agents 102 and 103 in order to manage devices regionally distributed or distribute load for management of a large number of devices. The agents 102 and 103 each monitor one or more network devices present within a network segment where each of the agents is installed. The manager 101 manages the devices trough the agents. The agents 102 and 103 execute processing on the devices associated with the respective agents in response to instructions from the manager 101, and transmit results of the processing to the manager 101. In a case where network devices to be monitored are present within the network segment to which an information processing apparatus provided with software for realizing the manager 101 is connected, if software realizing the agent is installed in the same information processing apparatus, the monitoring target devices can be monitored.

In an example illustrated in FIG. 1A, the agent 102 is associated with devices 104 and 105. Further, the agent 103 is associated with devices 106 and 107. Examples of the device include an image forming apparatus such as a printer and a multifunctional peripheral, a network-connected projector, a network camera, various kinds of Internet of Things (IoT) devices, and other network-connectable peripherals.

In FIG. 1A, a host computer 108 is an information processing apparatus in which the manager 101 operates. An apparatus in which the manager 101 operates is also referred to as a “management apparatus”. Host computers 109 and 110 are information processing apparatuses in which the agents 102 and 103 respectively operate.

A network 111 connects the host computer 108 and the host computers 109 and 110. A network 112 connects the host computer 109 and the devices 104 and 105. A network 113 connects the host computer 110 and the devices 106 and 107. The networks 111, 112, and 113 may be the same network. In that case, each management group that a system manager thinks of corresponds to the respective networks 111, 112, and 113 on the same network.

The manager 101 identifies the agents 102 and 103, and holds and manages information about the devices associated with the respective agents with use of a predetermined database. For example, a user uses a web browser through a web server incorporated in the manager 101 to operate the manager 101.

The manager 101 of the network device management system collects status information of the devices to be managed through the agent 102 and the like, and transmits a mail to the system manager according to the status information of the devices. Alternatively, the manager 101 collects log information of the managing target devices through the agent 102 and the like, and creates a report of a collection result. The system manager uses the report to grasp operating states of the respective devices.

Figure 1B:
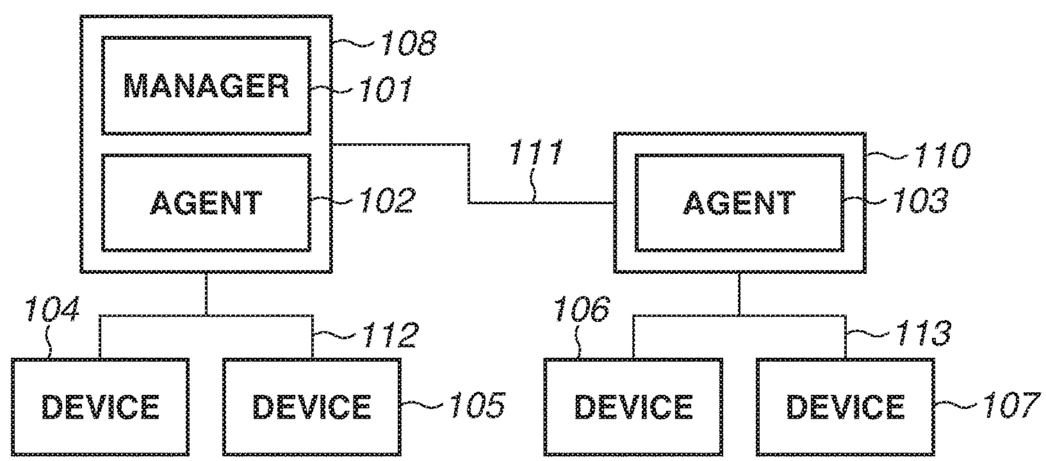
Figure 1C:
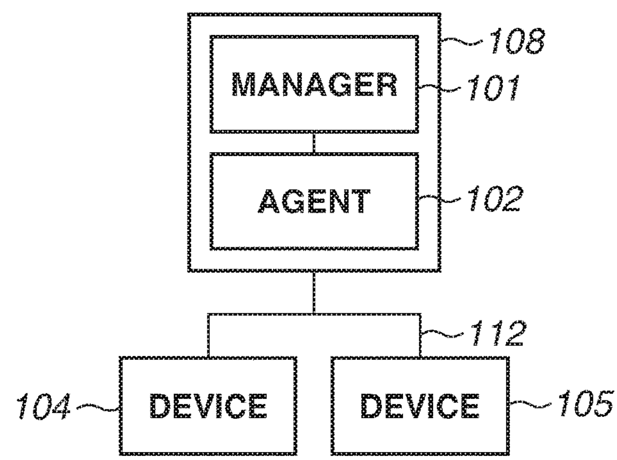

FIG. 1B and FIG. 1C are diagrams each illustrating another example of the network device management system.

The example illustrated in FIG. 1B is an example of the network device management system in a case where the manager 101 and the agent 102 illustrated in FIG. 1A operate in the same host computer 108.

In the case of the example illustrated in FIG. 1B, the manager 101 and the agent 102 perform communication through a local host connection. Such a configuration is used in a case where the number of devices to be managed is not large but the devices are geographically distributed, for example, in a case where the host computer 108 and the devices 104 and 105 are installed in a head office, and the host computer 110 and the devices 106 and 107 are installed in a branch office.

The example illustrated in FIG. 1C is an example of the network device management system in a case where the agent 103 illustrated in FIG. 1B is not disposed.

In the case of the example illustrated in FIG. 1C, such a configuration may be used in a small-scale network environment in which the number of devices to be managed is small and the devices are not geographically distributed.

Figure 2:
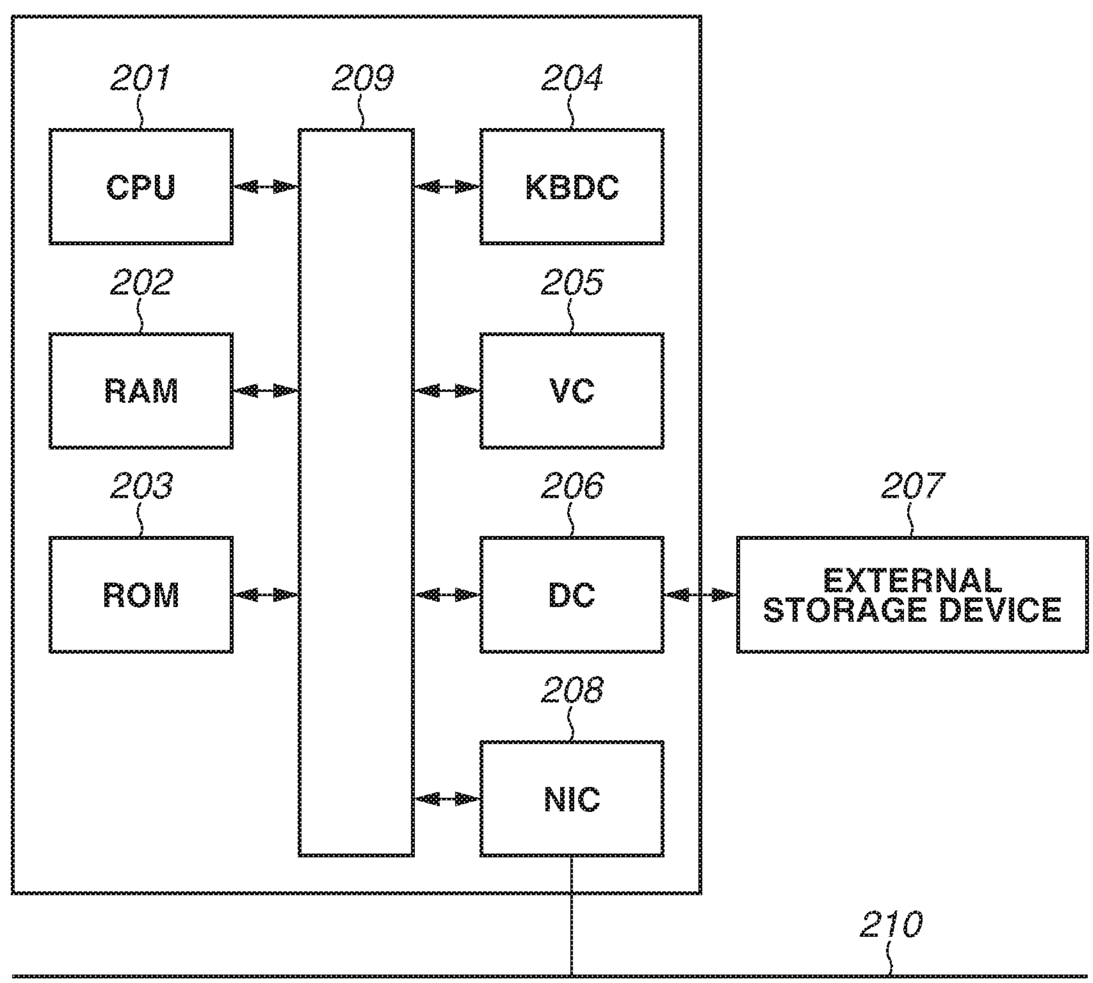
FIG. 2 is a hardware configuration diagram of a host computer.

FIG. 2 is a block diagram illustrating an example of a hardware configuration of any of the host computers 108, 109 and 110.

As illustrated in FIG. 2, the host computer includes a central processing unit (CPU) 201, a random access memory (RAM) 202, a read-only memory (ROM) 203, and an external storage device 207. The CPU 201 loads, into the RAM 202, software (program) that is stored in the ROM 203 or the external storage device 207 or is downloaded through a network 210, and executes the software as necessary, and comprehensively controls devices connected to a system bus 209.

The RAM 202 functions as a main memory, a work area, etc. for the CPU 201. The external storage device 207 is a hard disk (HD), a solid state drive (SSD), etc. The external storage device 207 holds various kinds of applications including a boot program, an operating system (OS), an authentication server, and an authentication client, database data, and user files.

A keyboard controller (KBDC) 204 transmits, to the CPU 201, information input from an unillustrated input device such as a keyboard and a pointing device. A video controller (VC) 205 controls display by a display apparatus including a liquid crystal display. A disc controller (DC) 206 controls access to the external storage device 207. A network interface card (NIC) 208 is a communication controller, and the host computer is connected to the network 210 through the NIC 208.

Figure 3:
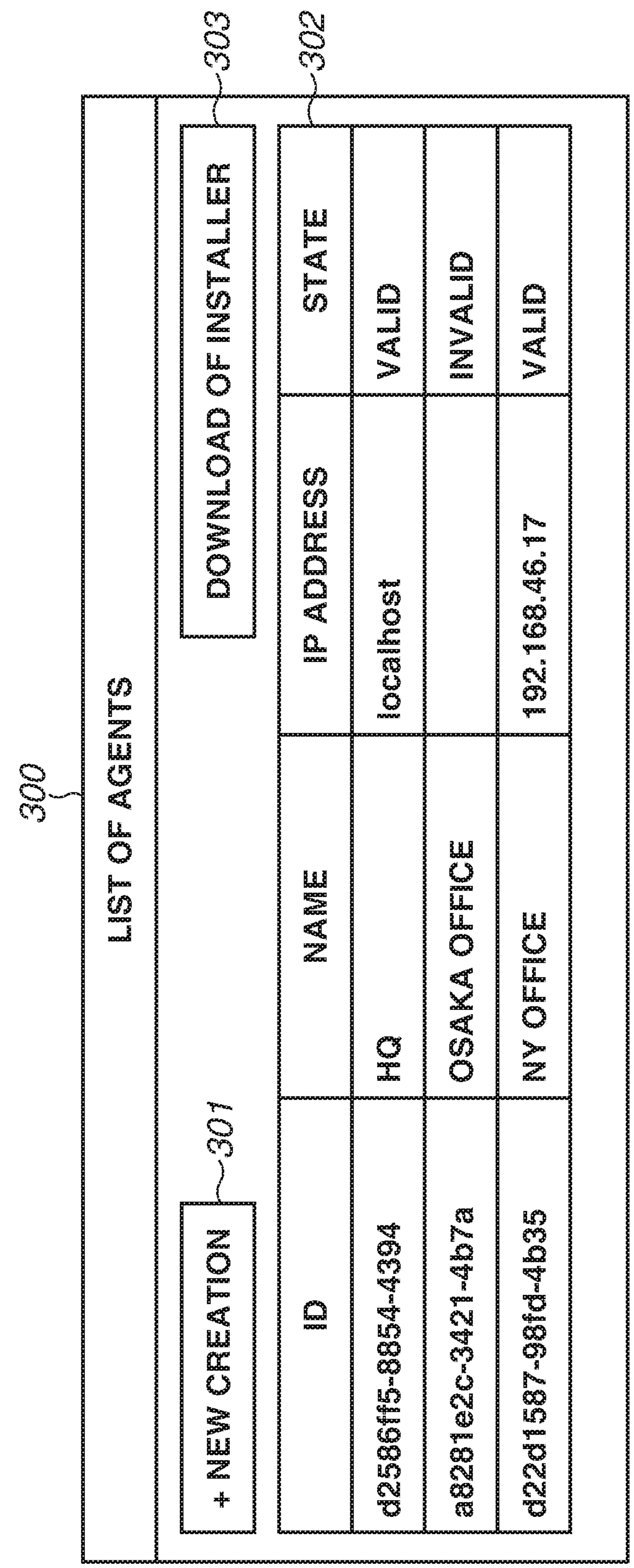
FIG. 3 is a diagram illustrating a screen of a list of agents.

FIG. 3 is a diagram illustrating an example of a screen on which a list of agents provided by the manager 101 is displayed (agent list screen 300). Screens illustrated in FIG. 3, FIGS. 4A and 4B, and FIG. 8 are provided by, for example, a web server incorporated in the manager 101, and are displayed on a web browser accessing the web server. In other words, these screens are displayed on a display of a computer in which the web browser operates. An operation on these screens is notified to the manager 101 through the web browser.

In FIG. 3, a "new creation" button 301 is a button to newly create an agent. When detecting depression of the button, the manager 101 displays an agent creation screen 400 (FIG. 4A described below). An agent list 302 is a list of agents managed by the manager 101. When click of any row in the agent list 302 is detected, the manager 101 displays an agent information screen 420 (FIG. 4B or FIG. 8 described below) of an agent included in the clicked row.

Each of the agents includes agent information such as an identification (ID) for unique identification assigned by the manager 101, a name of the agent named by the user, a state, and an internet protocol (IP) address of the agent. Here, the state of the agent is either "valid (active)" or "invalid (inactive)". To cause the agent to accurately cooperate with the manager 101, it is necessary to perform communication with the manager 101 when the agent is installed, and to activate the state of the agent. The "invalid" indicates a state where the agent has been created but has not been activated. The "valid" state means that activation processing has been performed.

The agent not activated does not include an IP address. Therefore, the IP address of the agent in the "invalid" state is empty. Further, in a case where the agent operates in the same host computer 108 as the manager 101, the manager 101 displays "local host" in a field of "IP address".

A "download of installer" button 303 is a button for downloading an agent installer. The agent installer is an installer for installing, in the information processing apparatus, an agent program that causes the information processing apparatus to operate as the agent. When depression of the "download of installer" button 303 is detected, the manager 101 starts, with respect to the web browser operated by the user, processing of downloading the agent installer in the host computer in which the web browser operates.

FIG. 4A is a diagram illustrating an example of the agent creation screen 400 that is displayed in response to depression of the "new creation" button 301 in FIG. 3.

In FIG. 4A, a name 401 is a user interface (UI) control where a name for identification of each of the agents is input by the user. A device address 402 is a UI control where an address range of the devices to be associated with the creating target agent (device information to be monitored by agent) is input. In this example, an address range of "192.168.10.0" to "192.168.11.225" and an address range of "192.168.15.0" to "192.168.15.255" are specified.

A check box 403 is a UI control for specifying whether to create the agent in the same apparatus (host computer 108 in present exemplary embodiment) as the manager 101. The check box 403 is controlled by the manager 101 so as to be checkable in a case where the created agent is not present in the same host computer 108 as the manager 101.

A "create" button 404 is a button for creating agent information based on the name 401 and the information input in the device address 402. The agent information to be created here includes the name of the agent and the device information to be monitored. When the manager 101 detects depression of the "create" button 404 by the user, the manager 101 creates the agent information, and saves the created agent information in a storage device in the manager 101. Further, in a case where the check box 403 has been checked, the manager 101 performs processing for installing the agent in a local host as described below.

FIG. 4B is a diagram illustrating an example of the agent information screen 420 that is displayed in response to click of the agent which is in the "invalid" state in the agent list 302 in FIG. 3.

In FIG. 4B, an ID 410 is an ID for uniquely identifying the agent assigned by the manager 101 when the agent is created. A state 411 indicates a current state of the agent. A name 412 is a UI control where a name for identification of each of the agents is input by the user. A device address 413 is a UI control where an address range of the devices to be associated with the agent is input.

Agent activation information 414 displays information for activating the agent. The agent activation information 414 is obtained by encoding (converting) the agent ID 410, and a uniform resource locator (URL) address of the manager 101, etc., and is decodable by the agent installer described below.

A check box 415 is a UI control for specifying whether to create the agent in the same host computer 108 as the manager 101. The check box 415 is controlled by the manager 101 so as to be checkable in a case where the created agent is not present in the same host computer 108 as the manager 101.

An "update" button 416 is a button for updating the agent information based on the information changed in the agent information screen 420. When the manager 101 detects depression of the "update" button 416 by the user, the manager 101 updates the agent information, and saves the updated agent information in the storage device in the manager 101. Further, in a case where the check box 415 is checked, the manager 101 performs processing for installing the agent in a local host as described below.

A "delete" button 417 is a button for deleting the agent information. When the manager 101 detects depression of the "delete" button 417 by the user, the manager 101 deletes the information relating to the agent saved in the storage device in the manager 101.

FIG. 5 is a diagram illustrating an example of an installation screen 510 for installing the agent in the host computer (e.g., host computer 110).

For example, in a case where a program file of the agent installer in the OS including a graphical user interface (GUI) is double-clicked to activate the agent installer, the screen is displayed. In other words, the screen is displayed on the display of the computer by the CPU of the computer which activates the agent installer. The user can acquire the agent installer by depressing the "download of installer" button 303 in FIG. 3.

In FIG. 5, agent activation information 500 is a UI control where information for activating the agent is input. The user can confirm information of the agent which is not activated, in the agent information screen 420 illustrated in FIG. 4B. The user inputs the agent activation information 414 (e.g., encoded agent ID, encoded URL address of manager 101) presented in the agent information screen 420, to the agent activation information 500. For example, the user operates a pointing device of the host computer 109 or 110 to copy the agent activation information 414 displayed in the agent information screen (FIG. 4B), and pastes and inputs the agent activation information 414 to the agent activation information 500.

An ID 501 is a UI control where the ID of the agent to be installed is input. The user acquires the ID of the agent to be installed, for example, from the agent list 302 in FIG. 3 or the agent information screen 420 in FIG. 4B, and inputs the ID to the ID 501.

A port number 502 is a UI control where a port number is input that is used when the manager 101 transmits a request to the agent. In this example, a default number "8443" is input.

A manager URL 503 is a UI control where a URL address of the manager 101 is input. For example, the user inputs to the input control 503, a URL used when operating the manager 101 by the web browser.

In a case where the agent activation information 500 is input, input of the ID 501 and the manager URL 503 is unnecessary. In other words, the user selectively input the agent activation information 500 or both of the ID 501 and the manager URL 503.

An "install" button 504 is a button for installing the agent program in the computer in which the agent installer is activated. When the agent installer detects depression of the "install" button 504 by the user, the agent installer uses the value input in the installation screen 510 by the user, to activate the agent and execute the installation processing (described in detail below with reference to FIG. 7).

The agent installer checks the values input in the UI controls 500, 501, 502, and 503, and allows the "install" button 504 to be pressed only in a case where the valid values have been input.

The agent installer can execute the processing of installing the agent without displaying the installation screen 510 when options are specified by arguments at the time of activation. In the case where the agent installer is activated by double clicking, the options are not specified (in normal use, the user does not activate agent installer by specifying options). An example in which the installer is activated from a command line assuming that the install program is "AgentInstall" is described below. "AgentInstall -q -i cb78ceed-2894-4de0 -u https://devmngr.abcinc.com/ -p 443"

Meanings of the respective options are described below.

-q: the installation processing is executed without displaying the installation screen 510.

In a case where "-q" is omitted, the installation screen 510 in FIG. 5 is displayed.

-i: the ID of the agent is specified. In a case where "-q" is specified, "-i" is not omittable.

-u: the URL of the manager 101 is specified. In the case where "-q" is specified, "-u" is not omittable.

-p: a port which receives a request from the manager 101 of the agent to be created is specified. In a case where "-p" is omitted, a prescribed value (e.g., "8443") is used. In a case where the port of the prescribed value is in use, the port number is incremented by 1 until unused port is found.

In a case where "-q" is not specified, the agent installer displays the installation screen 510 in FIG. 5. In this case, the agent installer sets the value specified by the argument in the corresponding UI control in the UI. For example, in a case where "-u https://devmngr.abcinc.com/" is specified, the screen in FIG. 5 is displayed with "https://devmngr.abcinc.com/" set in the manager URL 503.

Figure 6:
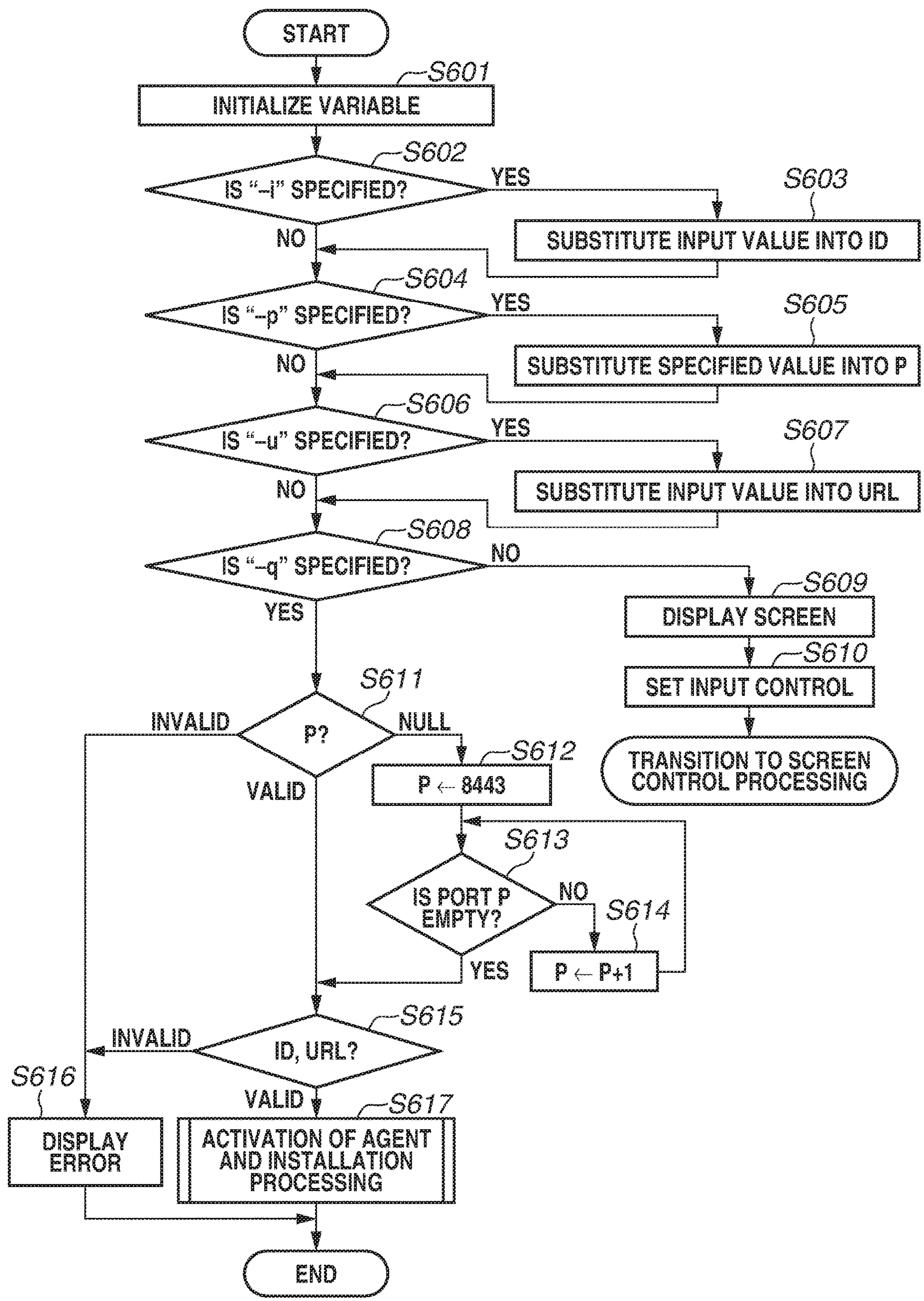
FIG. 6 is a flowchart illustrating processing in activation of an agent installer.

FIG. 6 is a flowchart illustrating an example of a flow of the processing when the agent installer is activated. The processing illustrated in the flowchart in FIG. 6 and in a flowchart in FIG. 7 described below is executed by the agent installer. In other words, the processing is realized when the CPU 201 of the host computer loads the program of the agent installer stored in the external storage device 207, into the RAM 202 and executes the program.

First, in step S601, the agent installer initializes variables "ID", "P", and "URL" in which specification of the options are stored (sets to null). In step S602, the agent installer determines presence or absence of "-i" option. In a case where the agent installer determines that "-i" option has been specified (Yes in step S602), the agent installer substitutes a specified value into the variable "ID" in step S603. The processing then proceeds to step S604.

On the other hand, in a case where the agent installer determines in step S602 that "-i" option has not been specified (No in step S602), the processing proceeds to step S604.

In step S604, the agent installer determines presence or absence of "-p" option. In a case where the agent installer determines that "-p" option has been specified (Yes in step S604), the agent installer substitutes a specified value to the variable "p" in step S605. The processing then proceeds to step S606.

On the other hand, in a case where the agent installer determines in step S604 that "-p" option has not been specified (No in step S604), the processing proceeds to step S606.

In step S606, the agent installer determines presence or absence of "-u" option. In a case where the agent installer determines that "-u" option has been specified (Yes in step S606), the agent installer substitutes a specified value into the variable "URL" in step S607. The processing then proceeds to step S608. In contrast, in a case where the agent installer determines in step S606 that "-u" option has not been specified (No in step S606), the processing proceeds to step S608.

In step S608, the agent installer determines presence or absence of "-q" option. In a case where the agent installer determines in step S608 that "-q" option has not been specified (No in step S608), the processing proceeds to step S609. For example, in the case where the agent installer is activated by double clicking, the options are not specified. Accordingly, all of the results of the condition determination in steps S602, S604, S606, and S608 become "No", and the processing proceeds to step S609.

In step S609, the agent installer displays the installation screen 510 illustrated in FIG. 5, and the processing then proceeds to step S610. In step S610, the agent installer sets the values of the variables "ID", "P", and "URL" respectively to the UI controls 501, 502, and 503, and the processing transitions to screen control processing (not illustrated). At this time, in a case where the value "P" is null, the agent installer sets the default value "8443" to the UI control 502. In the screen control processing, when the agent installer detects depression of the "install" button 504 by the user in the installation screen 510, the agent installer calls the activation of the agent and the installation processing illustrated in FIG. 7 described below. After that, the agent installer displays a processing result, and the agent installer ends.

Further, in a case where the agent installer determines in step S608 that "-q" option has been specified (Yes in step S608), the processing proceeds to step S611. In step S611, the agent installer determines the value of the variable "P". In a case where the value of the variable "P" is not a correct value (string representation of positive number from 0 to 65535) as the port number, the agent installer determines that the value of the variable "P" is invalid ("invalid" in step S611), and the processing proceeds to step S616. The processing in and after step S616 is described below.

In a case where the value of the variable "P" is a correct value (string representation of positive number from 0 to 65535) as the port number in step S611, the agent installer determines that the value of the variable "P" is valid ("valid" in step S611), and the processing proceeds to step S615. The processing in and after step S615 is described below.

Further, in a case where the agent installer determines in step S611 that the value of the variable "P" is null, namely, "-p" option has not been specified ("null" in step S611), the processing proceeds to step S612. In step S612, the agent installer substitutes the prescribed value "8443" into the variable "P", and the processing then proceeds to step S613.

In step S613, the agent installer determines whether an integer value expressed by the variable "P" is usable as the port number, namely, whether the port is not used by the OS or other applications (empty). In a case where the agent installer determines that the integer value expressed by the variable "P" is not usable as the port number (not empty) (No in step S613), the processing proceeds to step S614. In step S614, the agent installer adds 1 to the integer value expressed by the variable "P" (increments variable "P" by 1). The processing returns to step S613.

On the other hand, in a case where the agent installer determines in step S613 that the integer value expressed by the variable "P" is usable (empty) as the port number (Yes in step S613), the processing proceeds to step S615.

In step S615, the agent installer determines whether the values of the variables "ID" and "URL" are not null and are valid values. In a case where any of the values of the variables "ID" and "URL" is null or not set to a correct value ("invalid" in step S615), the processing proceeds to step S616. In step S616, the agent installer outputs an error message, and the program ends.

On the other hand, in a case where the agent installer determines in step S615 that the values of the variables "ID" and "URL" are not null and are valid values ("valid" in step S615), the processing proceeds to step S617. In step S617, the agent installer uses the values of the variables "ID", "P", and "URL" to activate the agent and the installation processing illustrated in FIG. 7. The installation processing then ends.

FIG. 7 is a flowchart illustrating an example of flow of the activation of the agent and the installation processing. The processing is called by the agent installer when depression of the "install" button 504 in FIG. 5 is detected and step S617 in FIG. 6 is performed. Further, the processing is operated based on the flowchart in FIG. 7 both in a case where the agent installer is executed by the host computer 108 in which the manager 101 operates, and in a case where the agent installer is executed by a host computer different from the host computer 108 in which the manager 101 operates.

The activation of the agent and the installation processing are called by the agent installer when the "install" button 504 in the installation screen 510 in FIG. 5 is depressed, or step S617 is performed at the time of the activation processing in a case where the installer with "-q" option is activated. The agent installer executes the activation and the installation processing with use of the agent activation information, the agent ID, the manager URL, the value of the port number, and the like that are specified at the time of the activation, or are input by the user in the installation screen 510. In a case where the agent activation information has been input, the agent installer acquires the agent ID and the manager URL from the agent activation information, and executes the activation and the installation processing.

First, in step S701, the agent installer extracts a host name from the URL address of the manager 101.

In step S702, the agent installer acquires an IP address from the host name extracted in step S701.

Next, in step S703, the agent installer checks whether the IP address of the manager 101 acquired in step S702 is the same as the IP address of the host computer in which the agent installer operates, namely, whether the agent installer operates in the host computer 108 in which the manager 101 operates. In a case where the IP address of the manager 101 is the same as the IP address of the host computer in which the agent installer operates as a result of the check (Yes in step S703), the processing proceeds to step S704.

In step S704, the agent installer replaces the host name of the URL of the manager 101 with "127.0.0.1". The processing then proceeds to step S705.

In a case where it is determined in step S703 that the IP address of the manager 101 is different from the IP address of the host computer in which the agent installer operates (No in step S703), the processing proceeds to step S705.

In step S705, the agent installer transmits an HTTP POST request to perform the activation, to an address that is created from the manager URL and the agent ID. For example, when the URL of the manager 101 is "https://devmngr.abcinc.com/" and the agent ID is "cb78ceed-2894-4de0", the URL of a transmission destination is, "https://devmngr.abcinc.com/api/agents/cb78ceed-2894-4de0/activate"

Alternatively, in a case where the agent installer is executed on the host computer 108 in which the manager 101 operates, the URL of the transmission destination is, "https://127.0.0.1/api/agents/cb78ceed-2894-4de0/activate"

Further, an example of a body text of the request message for activation is described below.

```
{
"address": "192.168.19.123",
"port": 443,
"timezone": "Tokyo Standard Time"
}
```

Here, "address" is an address of the host computer onto which the agent is installed, and "port" is a port number when the manager 101 transmits the request to the agent which the manager 101 installs. Further, "timezone" is a time zone of the host computer onto which the agent is installed. In this case, a base URL address when the manager 101 transmits the request to the agent is "https://192.168.19.123:443/".

In addition, in the case where the host part of the URL of the manager 101 is "127.0.0.1", namely, in the case where the agent installer operates in the host computer 108 in which the manager 101 operates, the "address" part of the message is "127.0.0.1" as described below.

```
{
"address": "127.0.0.1",
"port": 443,
"timezone": "Tokyo Standard Time"
}
```

By replacing the host name in step S703, even in the following cases, a similar result is obtained compared to the result in the case where the agent 102 is created in the host computer 108 same as the manager 101 in FIG. 4A and FIG. 4B:

1. The user executes the agent installer on the host computer 108 same as the manager 101.

2. The domain name system (DNS) name or the IP address of the host computer 108 is specified as the URL of the manager.

The processing by the manager 101 is described now. In step S712, the manager 101 receives the request transmitted in step S705.

Next, in step S713, the manager 101 determines whether the agent including the ID specified by the URL in the above-described request is present in the storage device in the manager 101 and whether the agent is in the "invalid" state. In a case where it is determined that the agent including the specified ID is not present or the agent including the specified ID is not in the "invalid" state (No in step S713), the processing proceeds to step S715. In step S715, the manager 101 transmits a response (request result) to the agent installer that is a transmission source of the request (request source). In this case, the manager 101 transmits a replay notifying activation failure to the agent installer as the request transmission source.

On the other hand, in a case where it is determined in step S713 that the agent including the specified ID is present and the agent is in the "invalid" state (Yes in step S713), the processing proceeds to step S714.

In step S714, the manager 101 activates the specified agent and generates a common key to be used in communication with the agent. Further, the manager 101 saves, in the storage device in the manager 101, the generated common key, and the address and the port number of the agent that are included in the body text of the activation request received in step S712, in association with the specified agent. The processing then proceeds to step S715. In step S715, the manager 101 transmits a response (request result) to the agent installer as the request transmission source. In this case, an example of a body text of a reply message transmitted from the manager 101 to the agent installer in the case where the activation has been successful, is described below.

```
{
"agentId": "cb78ceed-2894-4de0",
"key": "AgQGCAoMDhASFIHUgRNc3QFaChNS"
}
```

Here, "agentId" is the ID of the activated agent. In addition, "key" is a content that is obtained by performing Base64 encoding on the common key generated in step S714. The common key is used in a signature when the agent and the manager 101 communicates with each other. An example of a request header of the HTTP request from the activated agent to the manager 101 is described below.

```
GET /api/services HTTP/1.1
Content-Type: application/xml;charset=utf-8
X-Cmds-Date: Fri, 15 Jun 2012 08:10:57 GMT
Content-Location: /api/services
Authorization: HmacSha256 \
cb78ceed-2894-4de0:Niamx7qMftX8t0vHnMim5eAjrLPa0i4inO5hvkB8En4=
Connection: Keep-Alive
```

Here, a part before ":" in an Authorization header is the ID of the agent that transmits the request. A character string after ":" in the Authorization header is obtained by converting a result of calculation of HMAC-SHA256 signature of a specific element within the header into a character string through Base64, with use of the common key. The manager 101 uses the signature to confirm that the request is a correct request from the agent.

In step S706, the agent installer receives the response to the agent activation request transmitted to the manager 101 in step S705. The processing then proceeds to step S707.

In step S707, the agent installer determines whether the reception of the response has been successful. In a case where it is determined that the reception of the response has failed due to, for example, an error of the manager URL input in the UI control 503 (No in step S707), the processing ends.

In a case where it is determined in step S707 that the reception of the response has been successful (Yes in step S707), the processing proceeds to step S708. In step S708, the agent installer analyzes the reception result in step S706 to determine whether the agent activation by the manager 101 has been successful. In a case where it is determined that the agent activation has failed (No in step S708), the processing ends.

In a case where it is determined in step S708 that the agent activation by the manager 101 has been successful (Yes in step S708), the processing proceeds to step S709.

In step S709, the agent installer installs the agent to the host computer in which the agent installer operates.

Next, in step S710, the agent installer saves the setting of the installed agent.

The setting to be saved includes the following items:

URL of manager 101

ID of agent

Common key that is generated in step S714 and is included in body text of response received in step S706

Finally, in step S711, the agent installer activates the installed agent, and the processing ends.

As described in the description in FIG. 4A and FIG. 4B, in the case where the check box 403 in FIG. 4A or the check box 415 in FIG. 4B has been checked, the manager 101 creates the created or updated agent in the local host. In the case where the check box 403 or 415 has been checked, the manager 101 specifies the following options and activates the agent installer to install the agent in the local host:

"AgentInstall -q -i cb78ceed-2894-4de0 -u https://127.0.0.1/"

Here, "cb78ceed-2894-4de0" is the agent ID.

Further, it is assumed that the manager 101 provides a calling (REST API) function from the agent through HTTPS and a HTTPS standard port number "443". In normal use, only in this case, the agent installer is activated while the options are specified. In the case where the check box 403 in FIG. 4A or the check box 415 in FIG. 4B has been checked, the agent installation is executed through the processing, without explicit activation of the agent installer by the user.

Figure 8:
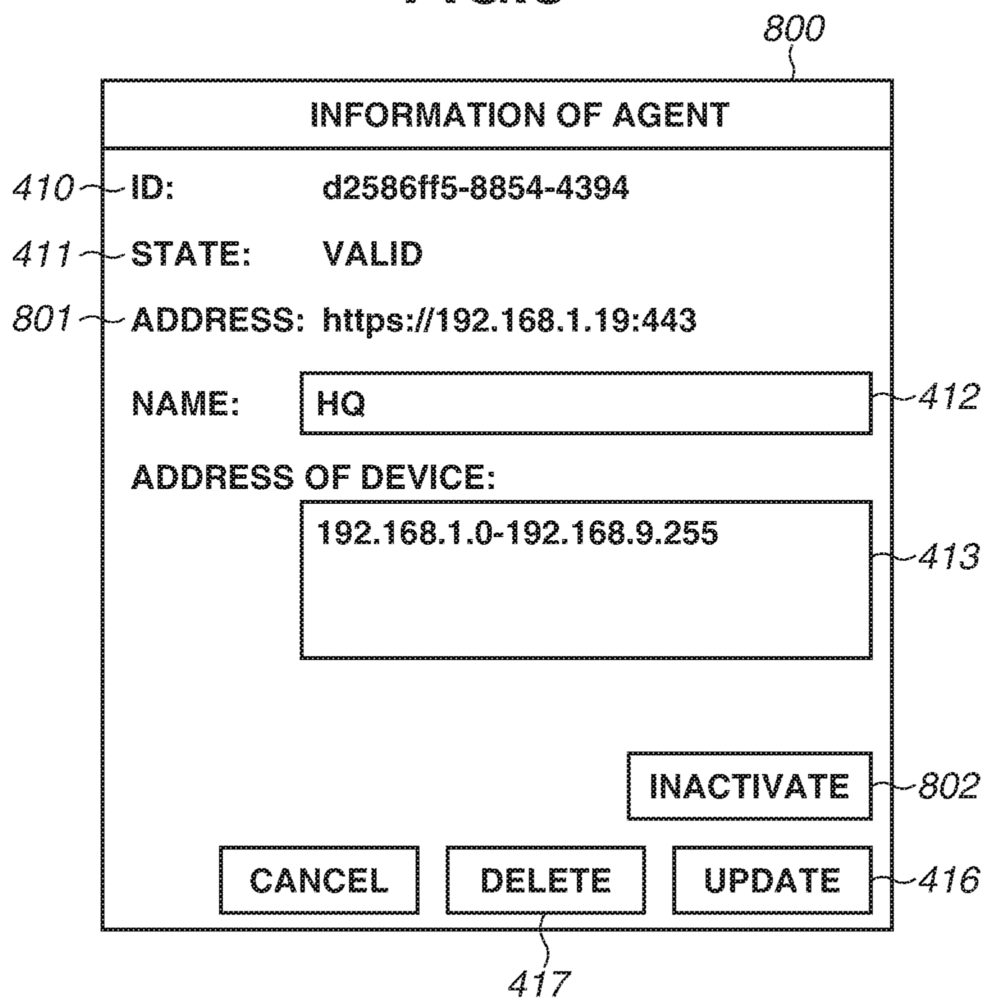
FIG. 8 is a diagram illustrating the agent information screen of the active agent.

FIG. 8 is a diagram illustrating an example of an agent information screen 800 that is displayed in response to click of the agent in the "valid" state in the agent list 302 of FIG. 3. The components same as the components in the agent information screen 420 in the case of the "invalid" state in FIG. 4B are denoted by the same reference numerals.

In FIG. 8, an address 801 is the agent address. The address 801 is a URL base when the manager 101 transmits a request to the agent. In the case where the agent operates in the host computer 108 same as the manager 101, a host part of the address 801 is "localhost".

When the user depresses an "inactivate" button 802, the manager 101 updates the state of the agent stored in the storage device of the manager 101, to be the "invalid" state. Further, in the case where the IP address of the agent is "127.0.0.1", namely, in the case where the agent operates in the host computer 108 same as the manager 101, the manager 101 executes processing for uninstalling the agent illustrated in FIG. 9 described below.

Further, when the user depresses a "delete" button 417, the manager 101 deletes the agent information of the agent stored in the storage device of the manager 101. Furthermore, in the case where the IP address of the agent is "127.0.0.1", namely, in the case where the agent operates in the host computer 108 same as the manager 101, the manager 101 executes the processing for uninstalling the agent illustrated in FIG. 9 described below.

Figure 9:
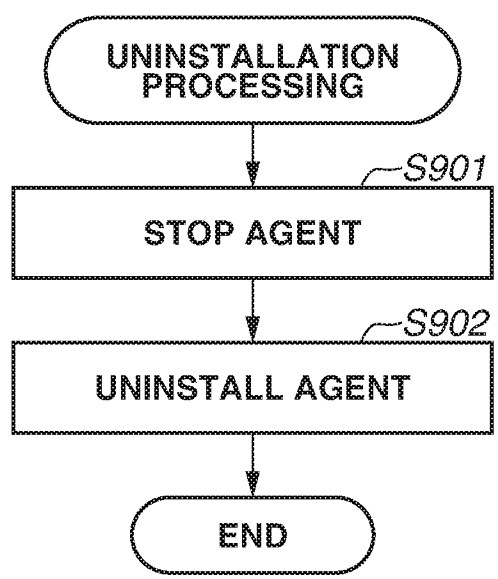
FIG. 9 is a flowchart illustrating processing of uninstalling an agent that operates on the same host computer as the manager.

FIG. 9 is a flowchart illustrating a flow of the processing by the manger 101 to uninstall the agent 102 that operates in the host computer 108 same as the manager 101. The processing illustrated in the flowchart in FIG. 9 is executed by the manager 101. In other words, the processing is realized when the CPU 201 of the host computer 108 loads the program of the manager stored in the external storage device 207 into the RAM 202, and executes the program.

First, in step S901, the manager 101 stops the agent 102 that operates in the host computer 108 and corresponds to the above-described update or deletion. In a case where the agent 102 operates as service or a daemon of the OS, the manager 101 requests stop of the service and the daemon to the OS, thereby stopping the operation of the agent 102. The daemon refers to a program operating as a background process in a multitask operating system, and is not a program interactively and directly controlled by the user.

Next, in step S902, the manager 101 executes the processing for uninstalling the agent 102 stopped in step S901. For example, the manager 101 calls application uninstallation processing provided by the OS or uninstallation processing incorporated into the agent 102, thereby executing uninstallation of the agent 102.

As described above, in the first exemplary embodiment, in the case where the agent is created in the host computer same as the host computer in which the manager operates, the manager automatically executes the agent installation processing. Such a configuration allows the user to easily install the agent program without performing download work of the agent program and input work for setting information for connection with the manager, in the case where the agent program is created in the host computer same as the host computer in which the manager operates. Further, in the case where the agent has been created in the host computer same as the host computer in which the manager operates, and the agent is inactivated or deleted, it is possible to uninstall the agent program without uninstallation work by the user.

A second exemplary embodiment will be descried below, only with respect to a difference with the first exemplary embodiment. Description of the configuration same as the configuration in the first exemplary embodiment is omitted.

Figure 10:
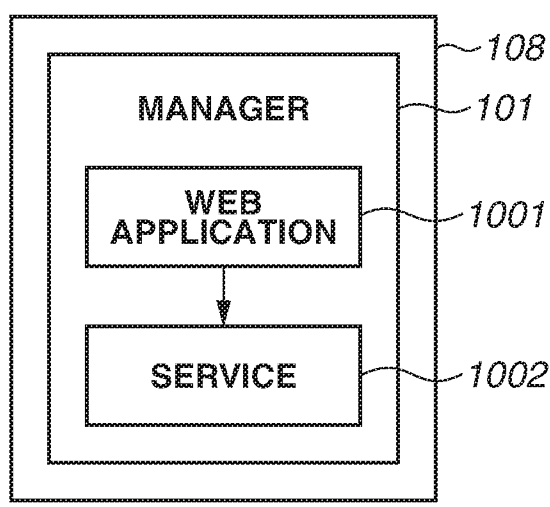
FIG. 10 is a configuration diagram of a network device management system according to a second exemplary embodiment.

FIG. 10 is a diagram illustrating an example of a configuration of a network device management system according to the second exemplary embodiment of the present invention.

In the second exemplary embodiment, the manager 101 described in the above-described first exemplary embodiment includes a web application 1001 and a service 1002, as illustrated in FIG. 10. The web application 1001 provides a UI to the user and receives the HTTP request from the agent. In this case, the web application 1001 does not include authority to execute installation of the agent 102. The service 1002 performs activation of processing according to a schedule, and the installation processing and the uninstallation processing of the agent. The service 1002 includes authority to execute installation of the agent. The service 1002 includes a remote procedure call (RPC) server function, and provides a function of executing installation and uninstallation of the agent in response to RPC call from the web application 1001.

In a case where the “create” button 404 is depressed while the check box 403 in FIG. 4A is checked, or in a case where the “update” button 416 is depressed while the check box 415 in FIG. 4B is checked, the following operation is performed in the manager 101. The web application 1001 in the manager 101 calls an RPC agent installation function of the service 1002 in order to install the created or updated agent in the local host. The service 1002 activates the agent installer to install the agent in the local host.

Further, in the case where the “inactivate” button 802 or the “delete” button 417 is depressed while the IP address of the agent 102 is “127.0.0.1” in FIG. 8, namely, the agent 102 operates in the host computer 108 same as the manager 101, the following operation is performed in the manager 101. The web application 1001 in the manager 101 calls an RPC agent uninstallation function of the service 1002. The service 1002 executes the processing illustrated in FIG. 9 to uninstall the agent 102.

As described above, the second exemplary embodiment achieves effects similar to the effects by the first exemplary embodiment.

As described above, according to the exemplary embodiments, in the case where the agent program is created in the management apparatus same as the apparatus that is the host computer in which the manager operates, the user can install the agent program only by instructing creation or update of the agent information. Further, in the case where the agent has been created in the apparatus same as the management apparatus, the user can uninstall the agent program only by instructing inactivation or deletion of the agent. In other words, the user can easily install or uninstall the agent program in the apparatus same as the management apparatus.

A third exemplary embodiment is described below, only with respect to a difference with the first exemplary embodiment. Description of the configuration same as the configuration described in the first exemplary embodiment is omitted.

The manager 101 cannot install or uninstall the agent in some cases, under the authority of the service in which the manager 101 operates, because of limitation of the operating system. In such a case, however, the manager 101 can instruct stop or start of the agent installed as the service, in some cases. In the third exemplary embodiment, the manager 101 is configured to control the agent installed in the host computer same as the manager 101 in such a limited environment.

In this case, the installer of the manager 101 copies a file configuring the agent at the time when the manager 101 is installed, and registers the agent as a service of the operating system. At this time, the installer of the manager 101 puts the service of the agent in a shutdown state.

The entire configuration of the system according to the third exemplary embodiment is the configuration illustrated in FIG. 1B or FIG. 1C. The agent 102 inside the host computer 108 same as the manager 101 in the figure is constantly present; however, the service of the agent 102 is put into a shutdown state or an active state depending on the setting of the operating system.

Figure 11A:
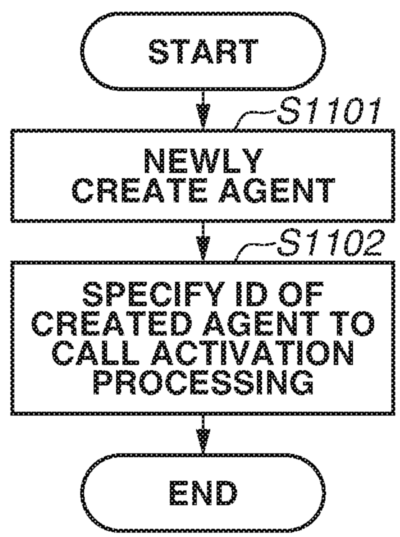
FIGS. 11A and 11B are flowchart illustrating processing for creating an agent that operates on the same host computer as a manager according to a third exemplary embodiment.

FIG. 11A is a flowchart illustrating a flow of processing (agent creation processing) in the case where the “create” button 404 is depressed while the check box 403 is checked in the agent creation screen in FIG. 4A, according to the third exemplary embodiment. The processing in the flowchart illustrated in FIG. 11A and in flowcharts illustrated in FIG. 11B and FIG. 12 described below is executed by the manager 101. In other words, the processing is realized when the CPU 201 of the host computer 108 loads the program of the manager stored in the external storage device 207 into the RAM 202, and executes the program.

In step S1101, the manager 101 creates the agent information, and saves the created agent information in the storage device in the manager 101.

Figure 11B:
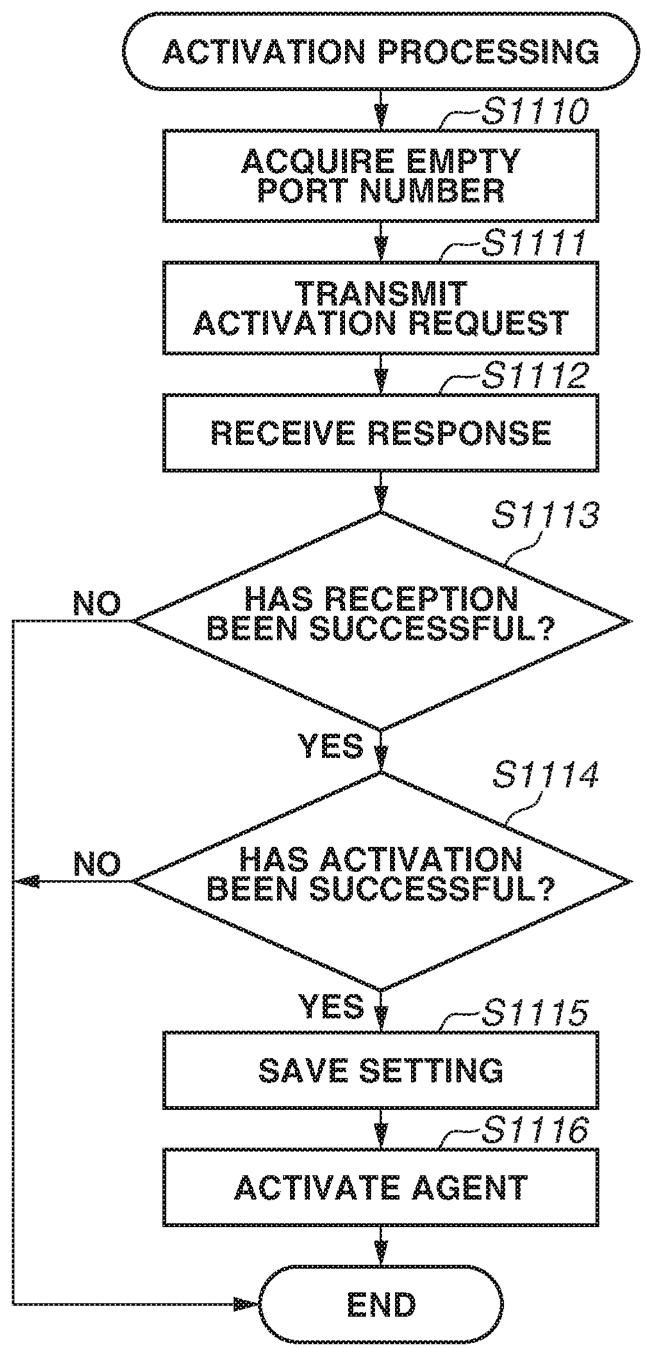

Thereafter, in step S1102, the manager 101 specifies the agent ID of the agent created in step S1101, to call the agent activation processing illustrated in FIG. 11B. The processing in this flowchart then ends. The activation processing refers to processing for changing the state of the agent stored in the manager 101, to the “valid” state.

FIG. 11B is a flowchart illustrating a flow of the processing (an agent activation processing) for enabling the agent 102 in the host computer same as the manager 101 according to the third exemplary embodiment. The processing is called in step S1102 of FIG. 11A. Further, when depression of the “update” button 416 by the user is detected while the check box 415 in FIG. 4B is checked, the manager 101 specifies the agent ID 410 to call the activation processing of the agent 102 in FIG. 11B.

First, in step S1110, the manager 101 decides an empty port number where the agent 102 receives a request from the manager 101. At this time, the manager 101 decides the empty port number by a procedure described in steps S612, S613, and S614 in FIG. 6.

Next, in step S1111, the manager 101 transmits the request to activate the agent 102, to the manager 101 itself. The transmission processing is performed as described in step S705 in FIG. 7. At this time, the manager 101 creates a message for activation, with use of the provided agent ID, the port number of the agent 102 decided in step S1110, and “localhost” that is the IP address of the agent 102.

After transmitting the request for activation, the manager 101 receives, in step S1112, a response to the activation request transmitted in step S1111. The reception processing is performed as described in step S706 in FIG. 7.

In step S1113, the manager 101 determines whether the reception of the response has been successful. In a case where it is determined that the reception of the response has failed (No in step S1113), the agent activation processing ends.

On the other hand, in a case where it is determined in step S1113 that the reception of the response has been successful (Yes in step S1113), the processing proceeds to step S1114. In step S1114, the manager 101 analyzes the reception result in step S1112 to determine whether the agent activation by the manager 101 has been successful. In a case where it is determined that the agent activation has failed (No in step S1114), the agent activation processing ends.

On the other hand, in a case where it is determined in step S1114 that the agent activation by the manager 101 has been successful (Yes in step S1114), the processing proceeds to step S1115. In step S1115, the manager 101 saves the setting of the activated agent. The information to be saved is similar to the information in step S710 in FIG. 7.

Next, in step S1116, the manager 101 changes the state of the agent 102 that has been installed and registered as a service in the installation of the manager 101, from "stop" to "start" (changes state from inactive state to active state), thereby activating the agent 102. As a result, the agent 102 is set as a service that is automatically executed at a time when the system of the host computer 108 is activated. Thus, the activation processing of the agent 102 by the manager 101 ends.

Figure 12:
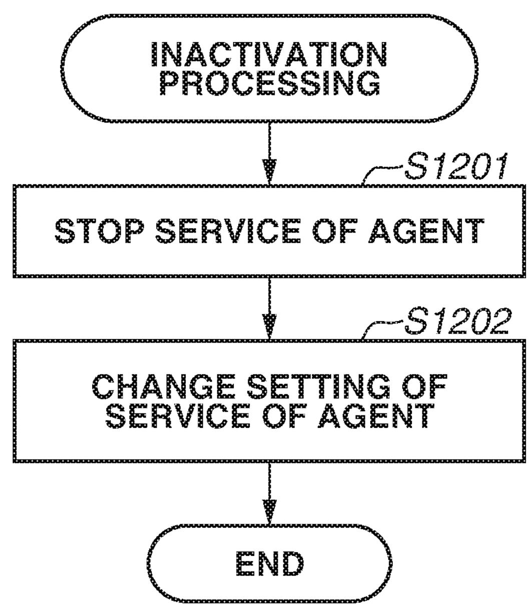
FIG. 12 is a flowchart illustrating processing for disabling the agent that operates on the same host computer as the manager according to the third exemplary embodiment.

FIG. 12 is a flowchart illustrating a flow of inactivation processing by the manager 101 to disable the agent 102 that operates in the host computer 108 same as the manager 101 according to the third exemplary embodiment. The processing of the flowchart in FIG. 12 is executed instead of the agent uninstallation processing in FIG. 9. That is, in the third exemplary embodiment, in the case where the "inactivation" button 802 in the agent information screen 800 in FIG. 8 is depressed and the corresponding agent is operating in the host computer 108 same as the manager 101, the manager 101 executes the processing in FIG. 12.

First, in step S1201, the manager 101 stops the service of the agent 102. Unlike the first exemplary embodiment, the uninstallation of the agent 102 from the host computer 108 is not performed in the third exemplary embodiment.

Further, in step S1202, the manager 101 changes the setting of the service of the agent 102 on the OS in the host computer 108 so as not to perform automatic activation of the service of the agent 102 at the time when the host computer 108 is activated. The inactivation processing then ends.

As described above, according to the third exemplary embodiment, in the case where the agent is created in the apparatus in which the manager 101 operates, the user can easily create the agent without performing download work of the agent program and input work for setting information for connection with the manager 101.

As described above, the exemplary embodiments allow the user to easily create the agent for the apparatus same as the management apparatus without performing the download work of the agent program and the input work of the setting information for connection with the manager 101 as the management apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2017-216978, filed Nov. 10, 2017, and No. 2018-112449, filed Jun. 13, 2018, which are hereby incorporated by reference herein in their entirety.

What is claimed is:

1. A management apparatus that a manager software for a device management is installed, the management apparatus comprising:

a memory storing instructions; and at least one processor executing the instructions causing the management apparatus to:

provide an agent management screen to a web browser operating in an information processing apparatus different from the management apparatus;

provide an agent creation screen to the web browser in response to a reception of a creation instruction via the agent management screen, wherein, on the agent creation screen, settings for an agent monitoring at least one device via a network are input;

execute agent creation processing based on a reception of an instruction indicating that the agent is to be created in the management apparatus via the agent creation screen when another agent has not been activated in the management apparatus yet, wherein, when another agent has been activated in the management apparatus, a reception of the instruction is restricted on the agent creation screen;

create an installer of an agent program including the settings for the agent based on a reception of a creation instruction via the agent creation screen without the instruction indicating that the agent is to be created in the management apparatus; and execute processing of downloading the installer to the information processing apparatus in which the web browser operates in response to a reception of a download instruction via the agent management screen after the installer has been created, wherein the agent creation processing is processing for creating within the management apparatus the agent in which setting information for connection with the management apparatus has been automatically set.

2. The management apparatus according to claim 1, wherein, in a case where, in the management apparatus, the agent has been registered in an inactive state, the state of the registered agent is changed from the inactive state to an active state in the agent creation processing, to perform activation of the agent based on agent information of the agent.

3. The management apparatus according to claim 2, wherein, in the agent creation processing, the activation is performed when the agent information of the agent is created.

4. The management apparatus according to claim 2, wherein the setting information for connection with the management apparatus is information converted from agent information.

5. The management apparatus according to claim 2, wherein the instructions further cause the management apparatus to create a key for communication with the agent in a case where the agent is activated, and set the created key to the agent.

6. The management apparatus according to claim 2, wherein the instructions further cause the management apparatus to delete the agent information, and put the agent into the inactive state in a case where the deleted agent information corresponds to the agent created in its own apparatus.

7. The management apparatus according to claim 1, wherein:

the settings for an agent includes agent information using an ID for the agent and address information as monitoring targets; and in a case where the download installer is executed in the information processing apparatus, installation processing for installing the agent program in the information processing apparatus is executed according to a user's input of setting information for connection with the management apparatus.

8. The management apparatus according to claim 7, wherein a first agent in the management apparatus based on the agent creation processing and a second agent in the information processing apparatus based on the installation monitor respective devices in respective network segments.

9. A management method for a management apparatus that a manager software for a device management is installed, the method comprising:

providing an agent management screen to a web browser operating in an information processing apparatus different from the management apparatus;

providing an agent creation screen to the web browser in response to a reception of a creation instruction via the agent management screen, wherein, on the agent creation screen, settings for an agent monitoring at least one device via a network are input;

executing agent creation processing based on a reception of an instruction indicating that the agent is to be created in the management apparatus via the agent creation screen when another agent has not been activated in the management yet, wherein, when another agent has been activated in the management apparatus, a reception of the instruction is restricted on the agent creation screen;

creating an installer of an agent program including the settings for the agent based on a reception of a creation instruction via the agent creation screen without the instruction indicating that the agent is to be created in the management apparatus; and executing the processing of downloading the installer to the information processing apparatus in which the web browser operates in response to a reception of a download instruction via the agent management screen after the installer has been created, wherein the agent creation processing is processing for creating within the management apparatus, the agent in which setting information for connection with the management apparatus has been set.

10. A non-transitory computer readable storage medium on which is stored a computer program for making a computer execute a method for a management apparatus that a manager software is installed for a device management, the method comprising:

providing an agent management screen to a web browser operating in an information processing apparatus different from the management apparatus;

providing an agent creation screen to the web browser in response to a reception of a creation instruction via the agent management screen, wherein, on the agent creation screen, settings for an agent monitoring at least one device via a network are input;

executing agent creation processing based on a reception of an instruction indicating that the agent is to be created in the management apparatus via the agent creation screen when another agent has not been activated in the management apparatus yet, wherein, when another agent has been activated in the management apparatus, a reception of the instruction is restricted on the agent creation screen;

creating an installer of an agent program including the settings for the agent based on a reception of a creation instruction via the agent creation screen without the instruction indicating that the agent is to be created in the management apparatus; and executing processing of downloading the installer to the information processing apparatus in which the web browser creates in response to a reception of a download instruction via the agent management screen after the installer has been created, wherein the agent creation processing is processing for creating within the management apparatus, the agent in which setting information for connection with the management apparatus has been set.

* * * * *